(12) United States Patent
Kish

(10) Patent No.: US 6,939,573 B2
(45) Date of Patent: Sep. 6, 2005

(54) METHOD AND APPARATUS FOR EVACUATING POCKETS OF INJECTED FLUID IN MEAT PRODUCTS

(75) Inventor: John A. Kish, Des Moines, IA (US)

(73) Assignee: Townsend Engineering Company, Des Moines, IA (US)

( * ) Notice: Subject to any disclaimer, the term of this patent is extended or adjusted under 35 U.S.C. 154(b) by 286 days.

(21) Appl. No.: 10/160,989

(22) Filed: May 31, 2002

(65) Prior Publication Data

US 2003/0224093 A1 Dec. 4, 2003

(51) Int. Cl.$^7$ ............................ A23L 1/31; A23B 4/28
(52) U.S. Cl. ..................... 426/281; 99/532; 99/495; 426/92; 426/478; 426/641; 426/644
(58) Field of Search .................... 426/92, 281, 478, 426/641; 99/495, 533

(56) References Cited

U.S. PATENT DOCUMENTS

| | | | | |
|---|---|---|---|---|
| 2,694,221 A | * | 11/1954 | Dura | 452/145 |
| 4,029,824 A | | 6/1977 | Langen | |
| 4,085,482 A | | 4/1978 | Charron | |
| 4,356,762 A | | 11/1982 | Langen | |
| 4,547,379 A | | 10/1985 | Moller et al. | |
| 4,612,683 A | | 9/1986 | Holz | |
| 4,680,832 A | * | 7/1987 | Langen | 99/532 |
| 4,881,458 A | * | 11/1989 | Higashimoto | 99/533 |
| 5,114,379 A | | 5/1992 | Prosenbauer | |
| 5,176,071 A | * | 1/1993 | Klaassen | 99/533 |
| 5,746,649 A | | 5/1998 | Skaar et al. | |
| 5,972,398 A | | 10/1999 | Ludwig et al. | |

FOREIGN PATENT DOCUMENTS

| | | |
|---|---|---|
| EP | 0 391 454 | 10/1990 |
| FR | 2726157 | 5/1996 |
| WO | WO 92/18012 | 10/1992 |

OTHER PUBLICATIONS

The American Heritage® Dictionary of the English Language, Fourth Edition Copyright © 2000 by Houghton Mifflin Company. retrieved from www.dictionary.com on Mar. 30, 2005.*

* cited by examiner

*Primary Examiner*—Keith Hendricks
*Assistant Examiner*—Maureen C. Donovan

(57) ABSTRACT

A method and apparatus for evacuating pockets of injected fluid in meat products involves the structure and use of a machine which has a longitudinal movable conveyor surface on the machine; a fluid injection station on the machine for injecting fluid into a meat product on the conveyor surface; a second station on the machine downstream of the fluid injection station; the second station comprising an assembly for applying compressive pressure to the injected meat and penetrating the meat with a plurality of projecting elements to create a plurality of fluid conduits in the injected meat wherein the compressive pressure will force fluid out of the injected meat through the fluid conduits when the projecting elements penetrate the pockets of fluid.

19 Claims, 5 Drawing Sheets

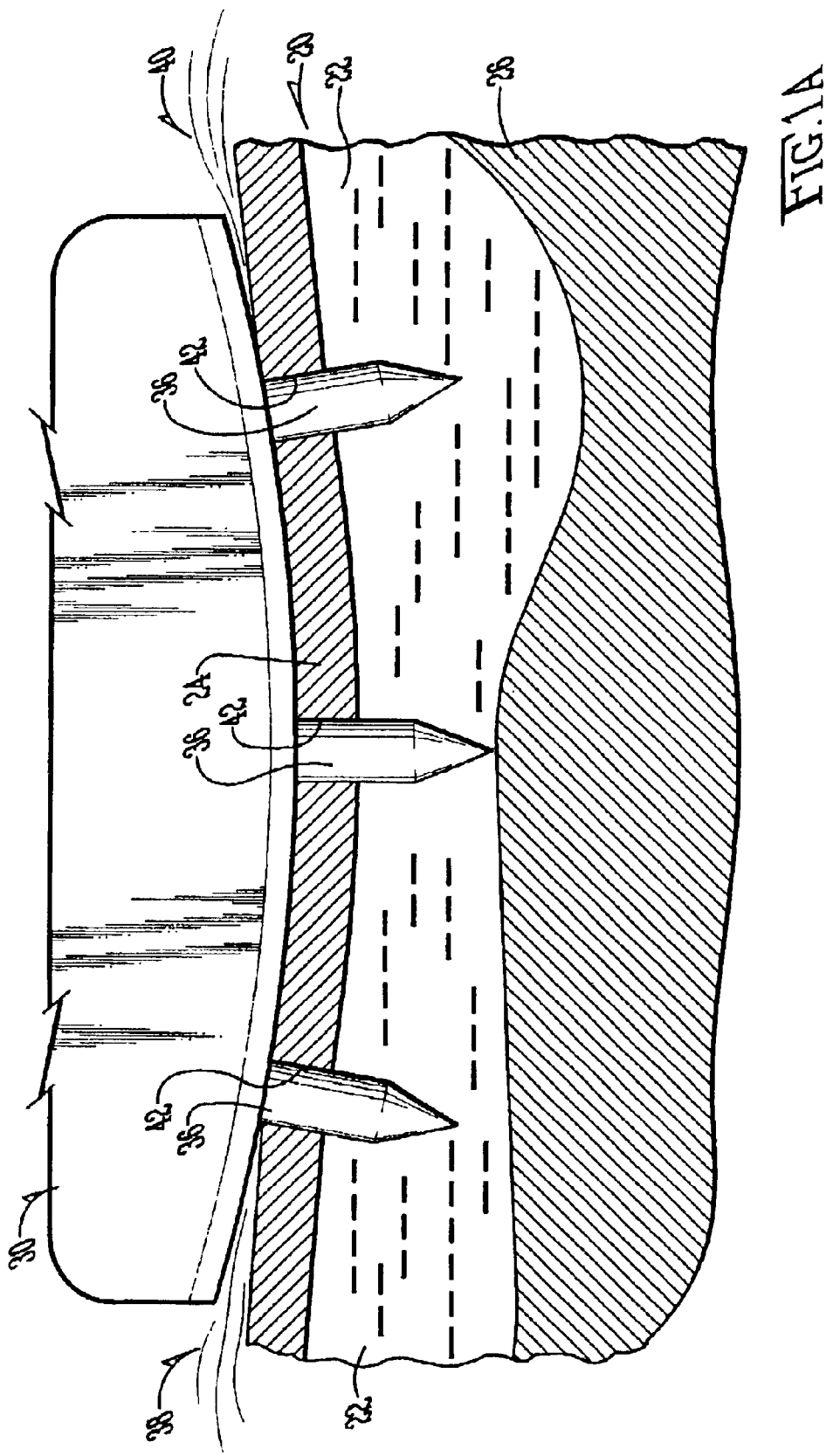

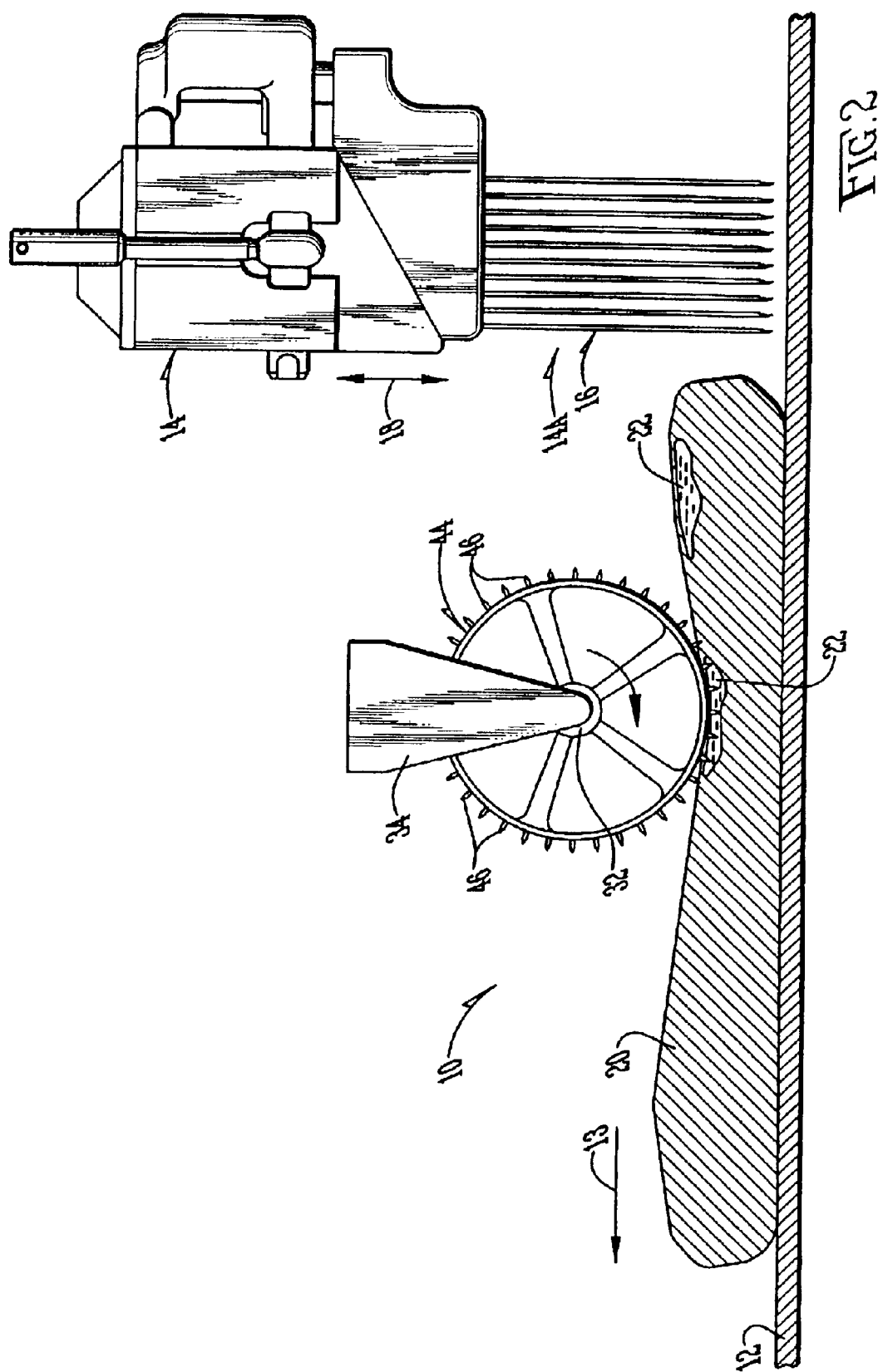

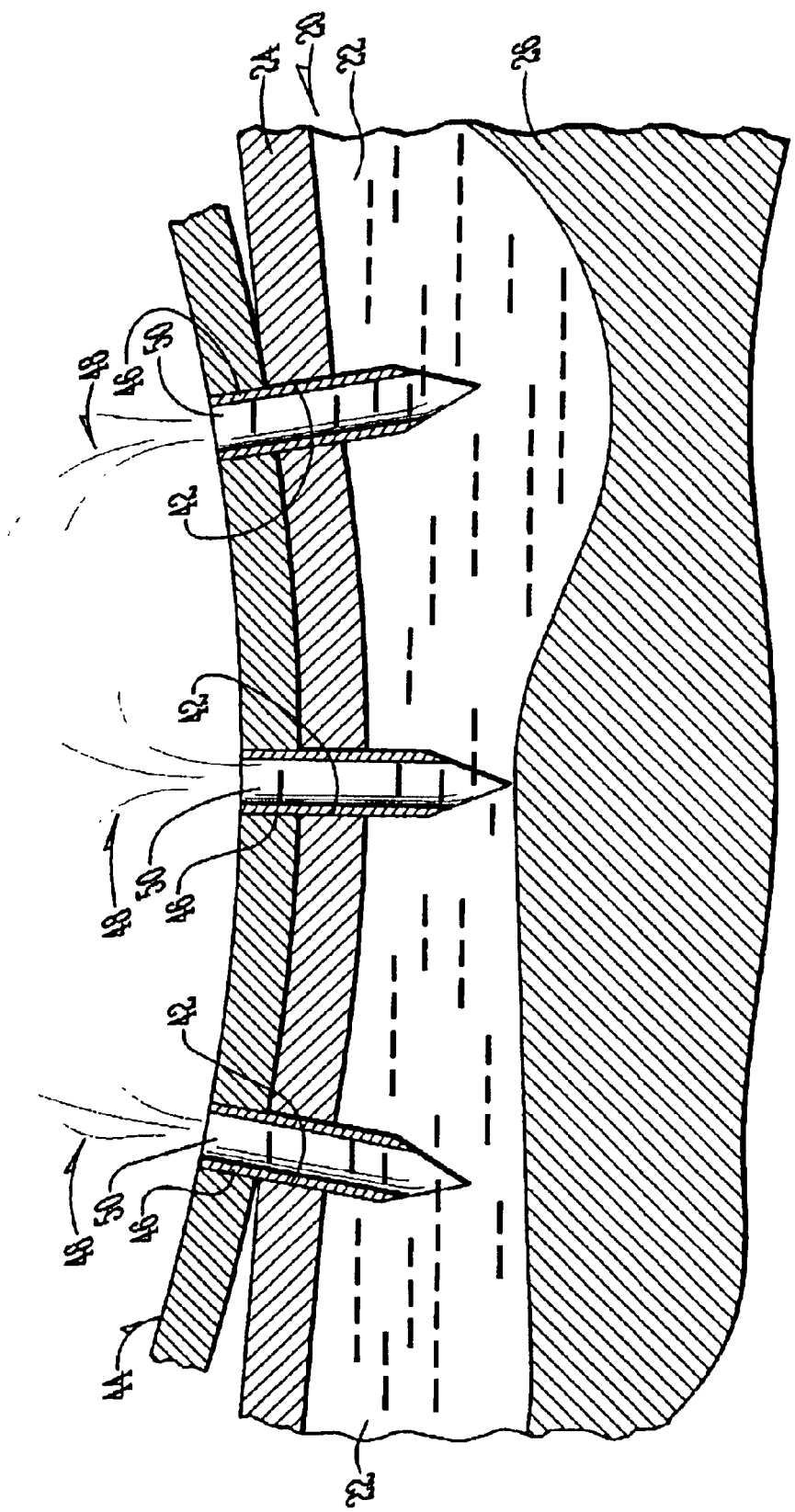

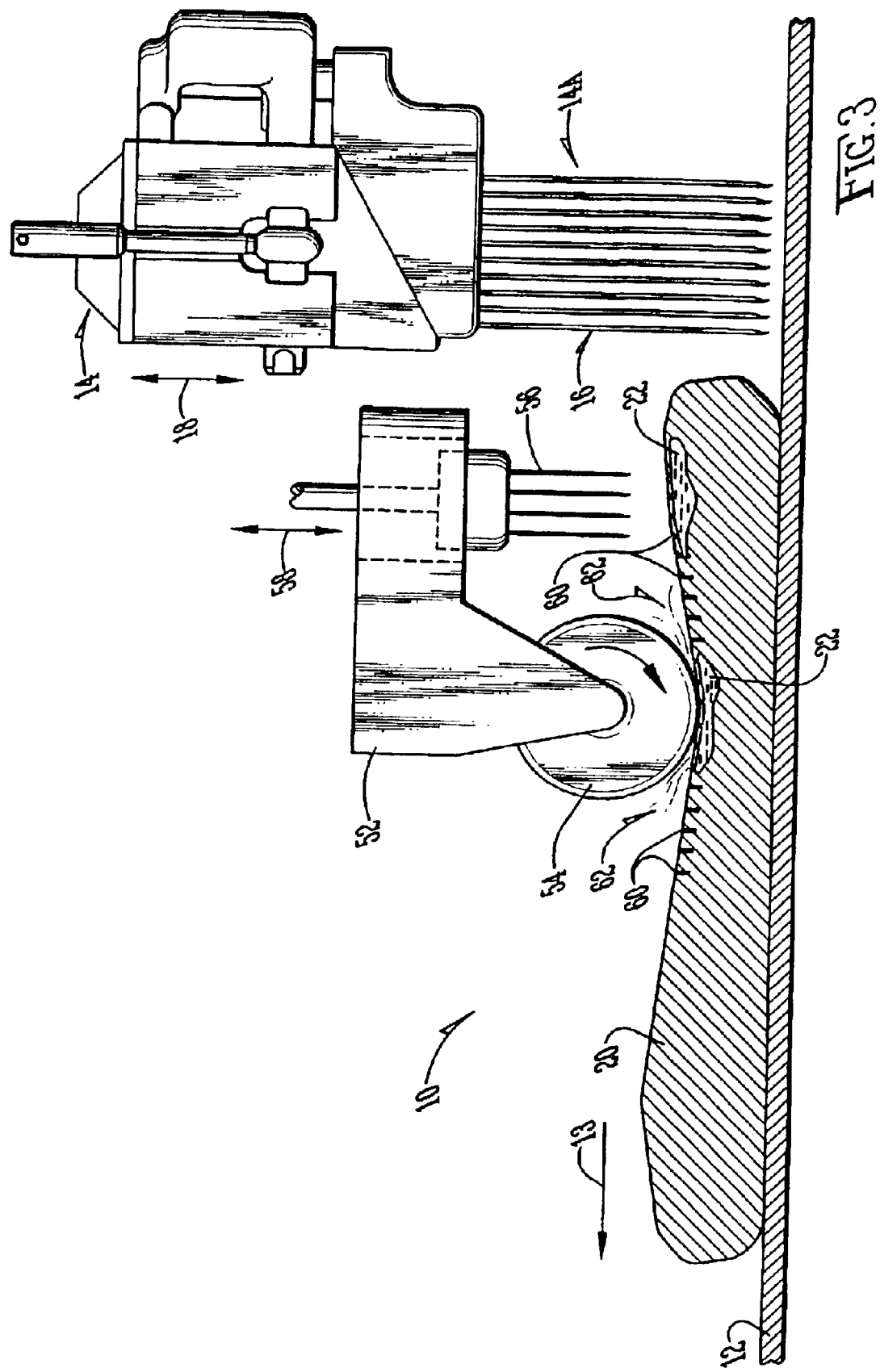

METHOD AND APPARATUS FOR EVACUATING POCKETS OF INJECTED FLUID IN MEAT PRODUCTS

BACKGROUND OF THE INVENTION

Meat injection machines (i.e., meat, poultry and fish products) have been in existence for many years. See U.S. Pat. No. 5,638,744, for example. Brine is typically injected from a battery of needles into a meat product moving to an injection station on a movable horizontal conveyor.

It is common for pockets of fluid to accumulate within a meat product in the injection process rather than to be uniformly distributed throughout the product, and this results in an unsatisfactory final product.

It is therefore a principal object of this invention to provide a method and apparatus for evacuating pockets of injected fluid in meat products.

A further object of this invention is to provide a method and apparatus for evacuating pockets of injected fluid in meat products which can be easily effected to eradicate pockets of fluid in a meat product as an adjunct structure or step to the normal injection process.

These and other objects will be apparent to those skilled in the art.

SUMMARY OF THE INVENTION

A method and apparatus for evacuating pockets of injected fluid in meat products involves the structure and use of a machine which has a longitudinal movable conveyor surface on the machine; a fluid injection station on the machine for injecting fluid into a meat product on the conveyor surface; a second station on the machine downstream of the fluid injection station; the second station comprising an assembly for applying compressive pressure to the injected meat and penetrating the meat with a plurality of projecting elements to create a plurality of fluid conduits in the injected meat wherein the compressive pressure will force fluid out of the injected meat through the fluid conduits when the projecting elements penetrate the pockets of fluid.

BRIEF DESCRIPTION OF THE DRAWINGS

FIG. 1A is an enlarged scale sectional view of the needles on the roller of FIG. 1 penetrating a fluid pocket in a meat product;

FIG. 2 is an alternate form of the invention similar to that of FIG. 1;

FIG. 2A is an enlarged scale sectional view of the needles on the roller of FIG. 2 penetrating a fluid pocket in a meat product; and FIG. 3 is a side elevational view of a second alternate form of the invention.

DESCRIPTION OF THE EMBODIMENTS OF THE INVENTION

Figure 1:
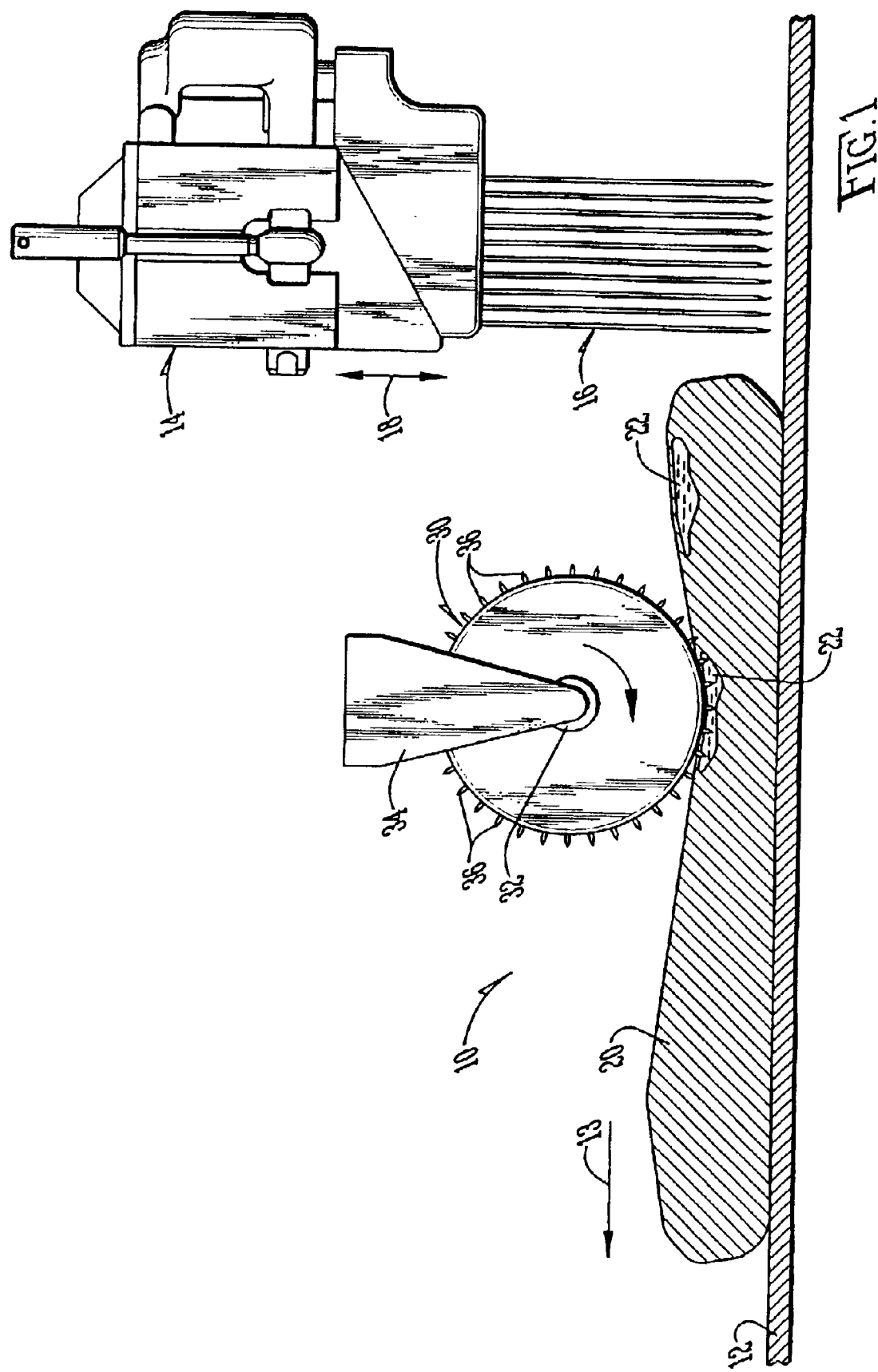
FIG. 1 is a side elevation of an injection machine illustrating the structure of this invention.

With reference to FIG. 1, an injection machine 10 has a longitudinally movable conveyor 12 mounted on a conventional machine frame (not shown). The arrow 13 in FIG. 1 indicates the normal direction of movement of the conveyor. An injection head 14 is suspended on the frame over the conveyor in an injection station 14A. The injection head includes a conventional battery of fluid injecting needles 16.

The injection head conventionally moves alternatively in an upper and then downward direction as indicated by the arrow 18. The conveyor 12 is programmed to stop and start so that a meat product 20 (e.g., pork belly) moves under the injection head 14 when the injection head is in an upwardly position. The conveyor progressively moves the meat product 20 through the injection station and the battery of fluid injecting needles 16 conventionally penetrate the meat product and inject fluid therein while the meat product is progressively moved intermittently through the injection station 14A in harmony with the upward and downward movement of the injection head 14. The foregoing represents the typical operation of a meat injection machine as generally illustrated and described in the above referenced U.S. Pat. No. 5,638,744.

The numerals 22 indicate pockets of fluid that accumulate in the body of meat product 20 on certain occasions. With reference to FIG. 1A, the meat product normally would have a layer of lean meat 24 on its upper surface and a layer of fat 26 therebelow. The pocket of fluid 22 can be located anywhere within the body of the meat product 20.

A compression wheel 30 is pivotally mounted at 32 to bracket 34 which is positioned on the frame in a manner to exert downward pressure on the meat product 20. Whether the bracket 34 is fixed to the frame at a height normally calculated to compress the meat, or whether it is urged downwardly by a resilient force such as a spring is of no great moment. The important thing is that the compression wheel must exert sufficient downward force on the meat product so that the solid nails 36 (FIG. 1A) can penetrate the meat product sufficiently to gain access to the fluid pocket 22. With reference to FIG. 1A, the solid needles 36, which terminate in a point at their outward ends, permit the fluid in pocket 22 to escape in a fluid spray 38 and 40 through the apertures 42 in the meat product created by the solid needles 36.

It is therefore seen that the compression wheel 30 will force the fluid out of pocket 22 and thence out of the meat product to fully evacuate the pocket 22 by reason of the compressive force exerted thereon by wheel 30.

A similar arrangement is shown in FIGS. 2 and 2A where a compression wheel 44 similar to wheel 30 is provided on bracket 34. Compression wheel 44 has a plurality of radially extending hollow needles 46 which function essentially like the solid needles 36 except that the compression on the meat product 20 by the compression wheel 44 causes the fluid in pocket 22 to be forced out of the upper ends of the hollow needles to create fluid spray patterns 48. Thus, the compression wheels 30 and 44 operate very much the same except that the route of escape of the fluid in pockets 22 follows a different escape route. The fluid spray 48 escapes from the pocket 22 in FIG. 2A through the center bores 50 of the needles.

With reference to FIG. 3, a further alternate embodiment of the invention is shown where a bracket 52 is supported by the frame and pivotally supports a smooth roller 54 which serves as a compression wheel and which rolls over the top of the meat product 20. A needle assembly 56 is supported on bracket 52 and is adapted to move in a downward direction as indicated by the arrow 58 by any suitable mechanism. The needles of the needle assembly 56 penetrate the fluid pockets 22 and create a plurality of small apertures 60 through which the fluid in the pockets escape to create spray 62 as shown in FIG. 3.

It is therefore seen that this invention provides both a method and means of evacuating fluid from pockets in a meat product in conjunction with the injection process in an efficient and effective manner. Thus, the objectives of this invention are fully met.

What is claimed is:

1. A method of evacuating pockets of injected fluid in meat products, comprising, taking a quantity of meat that has been injected with fluid and wherein pockets of fluid have accumulated in the meat, applying compressive pressure to the injected meat and penetrating the meat with a plurality of projecting elements to create a plurality of fluid conduits in the injected meat wherein the compressive pressure will force fluid out of the injected meat through the fluid conduits when the projecting elements penetrate the pockets of fluid; and wherein the compressive pressure and the penetration of the meat by the projecting elements takes place simultaneously.

2. The method of claim 1 wherein the projecting elements are hollow needles with upper and lower ends wherein the fluid in the pockets can be discharged upwardly through the needles when compressive force is applied to the meat.

3. The method of claim 2 wherein the hollow needles are radially positioned on a wheel that exerts compressive force on the meat.

4. The method of claim 1 wherein the projecting elements are solid needles which are radially positioned on a wheel that exerts compressive force on the meat.

5. The method of claim 1 wherein the meat is on a longitudinally moving conveyor which first moves the meat through a meat injection station, and then moves the meat to a second station where it is subjected to penetration by projecting elements and subjected to compressive pressure.

6. The method of claim 5 wherein the second station is a wheel with a plurality of projecting elements radially located on a periphery of the wheel, and wherein the meat product is moved longitudinally by the conveyor through the second station wherein the meat is compressed between the conveyor and the wheel.

7. A meat injection machine, comprising, a longitudinal movable conveyor surface on the machine;

a fluid injection station on the machine for injecting fluid into a meat product on the conveyor surface, a second station on the machine downstream of the fluid injection station, and means at the second station for applying compressive pressure to the injected meat and for penetrating the meat with a plurality of projecting elements to create a plurality of fluid conduits in the injected meat wherein the compressive pressure will force fluid out of the injected meat through the fluid conduits when the projecting elements penetrate the pockets of fluid, wherein the compressive pressure and the penetration of the meat with the plurality of projecting elements takes place simultaneously.

8. The method of claim 7 wherein the projecting elements are hollow needles with upper and lower ends wherein the fluid in the pockets can be discharged upwardly through the needles when compressive force is applied to the meat.

9. The machine of claim 8 wherein the hollow needles are radially positioned on a wheel that exerts compressive force on the meat.

10. The machine of claim 7 wherein the projecting elements are solid needles which are radially positioned on a wheel that exerts compressive force on the meat.

11. The machine of claim 7 wherein the second station is a wheel with a plurality of projecting elements radially located on a periphery of the wheel, and wherein the meat product is moved longitudinally by the conveyor through the second station wherein the meat is compressed between the conveyor and the wheel.

12. A method of evacuating pockets of injected fluid in meat products, comprising, taking a quantity of meat that has been injected with fluid and wherein pockets of fluid have accumulated in the meat, applying compressive pressure to the injected meat and penetrating the meat with a plurality of projecting elements to create a plurality of fluid conduits in the injected meat wherein the compressive pressure will force fluid out of the injected meat through the fluid conduits when the projecting elements penetrate the pockets of fluid; and wherein the projecting elements are hollow needles with upper and lower ends adapted to permit the fluid in the pockets to be discharged upwardly into the lower ends, through the needles, and exiting the upper ends when compressive force is applied to the meat.

13. The method of claim 12 wherein the penetration of the meat by the projecting elements precedes the application of compressive pressure to the meat.

14. The method of claim 12 wherein the hollow needles are radially positioned on a wheel that exerts compressive force on the meat.

15. The method of claim 13 wherein the compressive force is applied to the meat by a smooth circular wheel.

16. The method of claim 12 wherein the meat is on a longitudinally moving conveyor which first moves the meat through a meat injection station, and then moves the meat to a second station where it is subjected to penetration by projecting elements and subjected to compressive pressure.

17. The method of claim 16 wherein the second station is a wheel with a plurality of projecting elements radially located on a periphery of the wheel, and wherein the meat product as moved longitudinally by the conveyor through the second station wherein the meat is compressed between the conveyor and the wheel.

18. The method of claim 13 wherein the meat is on a longitudinally moving conveyor which first moves the meat through a meat injection station, and then moves the meat to a second station where it is subjected to penetration by projecting elements and subjected to compressive pressure.

19. The method of claim 18 wherein the second station is comprised of a needle penetration assembly followed by a wheel that exerts compressive force on the meat.

* * * * *